G. E. BRADSHAW.
MOTOR CYCLE FRAME.
APPLICATION FILED SEPT. 19, 1918.
1,306,995. Patented June 17, 1919.
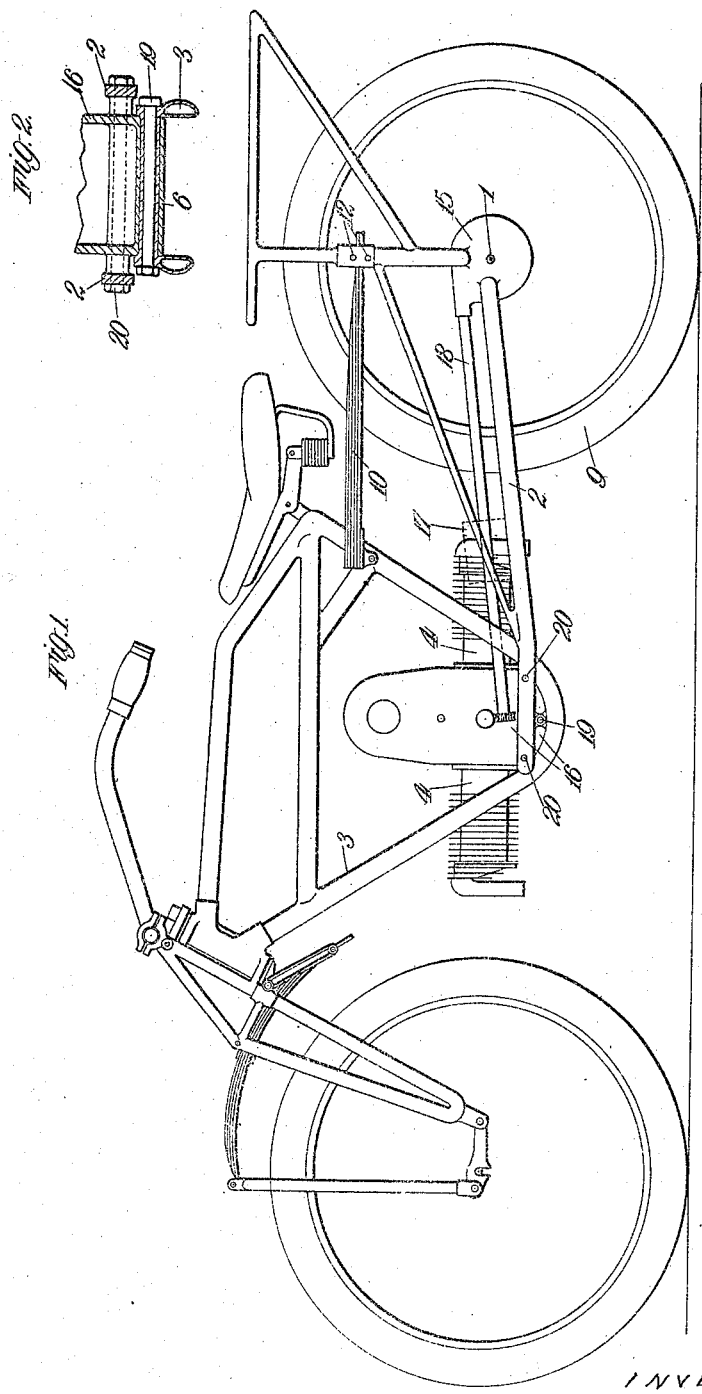
INVENTOR
Granville E. Bradshaw
By Wm Wallace White
ATTY

UNITED STATES PATENT OFFICE.

GRANVILLE EASTWOOD BRADSHAW, OF HERSHAM, WALTON-ON-THAMES, ENGLAND, ASSIGNOR OF ONE-HALF TO A. B. C. MOTORS LIMITED, OF HERSHAM, WALTON-ON-THAMES, ENGLAND.

MOTOR-CYCLE FRAME.

1,306,995. Specification of Letters Patent. Patented June 17, 1919.

Application filed September 19, 1918. Serial No. 254,811.

*To all whom it may concern:*

Be it known that I, GRANVILLE EASTWOOD BRADSHAW, a subject of the King of Great Britain and Ireland, of A. B. C. Motor Works, Hersham, Walton-on-Thames, in the county of Surrey, England, have invented new and useful Improvements in Motor-Cycle Frames, of which the following is a specification.

In motor cycles wherein the engine is bolted rigidly to the frame, and the rear wheel supported from the side frame by means of springs, if, for example, the system of power transmission is by chain, the engine ordinarily pulls on the top side of the chain. It presents the disadvantage, therefore, that as the back wheel rises, it moves the top part of the chain slightly in the direction in which the engine is pulling, and lessens the load. Conversely as the rear wheel falls, there is a pull in the chain in the reverse direction, and a snatch occurs which upsets the evenness of the drive. When the power transmission is by shaft, a flexible coupling is usually necessary with the existing arrangements for springing the vehicle. Now, according to my invention the engine and gear box are able to rock slightly to and fro, keeping the shaft free from stress, or the chain at a constant tension. The same result applies to bevel or worm transmission.

My improvements are especially applicable to those motor cycles wherein the power of the engine has to be transmitted through shafts or chains, or any other known gearing, to wheels supported from the main frame by springs which lessen the shocks due to uneven road surfaces.

My invention enables universal or sliding joints to be dispensed with, for instance, in the case of a shaft-driven cycle; neither is it necessary to have radius rods with hinge joints or sliding connections, nor is it imperative to have shackles or shackle bolts on the springs, although any of these may be fitted if desired. Also I gain a further advantage in that the springs can be carried in such a manner that they are removed some distance away from the road wheels, and can more readily be protected from dust and mud.

My invention furthermore reduces to a minimum the amount of unsprung weight, by carrying the springs on the sprung part of the vehicle, instead of on the axle.

Reference will hereinafter be made to the accompanying drawings, illustrating a convenient example of my said invention, and to the reference numerals thereon. Figure 1 is a side elevation of a motor cycle, and Fig. 2 a vertical section through the crank case.

The engine 4 is not, as in ordinary motor cycle practice, carried on the main frame, but on the sub-frame 2, or any suitable part of the main frame 3, or an extension thereof.

The engine 4 will thus rock slightly forward and backward as the rear wheel 9 rises and falls on the surface of the road. This does not have any detrimental effect, compared with previous forms because even when the engine was fitted to the sprung members, there was roughly the same amount of rocking and movement when on rough roads, due to the reaction of the springing. This remark applies also to a gear box 17 if used, which can be mounted on the sub-frame 2.

Leaf springs 10 of the type known as quarter-elliptic, are shown as examples, the thick end of the spring being bolted to the main frame 3 (which therefore bears its weight) and the thin end working between rollers mounted on pins 12 fixed in a box 5 formed integral with the upright member of the sub-frame 2 (or alternatively shackles could be used) in such a manner as to prevent relative lateral movement between the main frame 3 and the sub-frame 2; this removes stress or pressure from the transverse joint described below when the vehicle is traveling around corners. The springs 10 could bear directly or indirectly upon the rear wheel axle instead of on the sub-frame, if preferred. They are two in number, one on each side of wheel 9.

The transverse joint may be a roller or ball bearing, and it may be connected to the oiling system in the engine or gearbox, or pass through the engine or gearbox so as to be efficiently and automatically lubricated.

The transverse joint which is illustrated in the figures, comprises a bolt 19 adapted to tighten in a bush 6 (Fig. 2) which passes through the crank case 16, where it is constantly lubricated by oil in the crank case penetrating through oil holes; but, if any objection should be made to this position on the ground that it throws undue torque stress upon the crank case 16, for example, the joint could easily be located outside the crank case and lubricated in any other manner, or it could remain in the crank case and be supported mainly by external lugs rigid with the sub-frame. Bolts 20 hold the engine on to the sub-frame 2, but any other design of mounting could be used.

When a shaft is used to transmit the power from the engine 4 to the rear axle 1, it is inclosed in a tube 18 extending from the engine 4 to the rear axle casing 15; the tube 18 is also integral with the sub-frame 2 and may be braced to any part of it for increasing the strength of same, and for withstanding the torque exerted by the drive. It might even form the entire or partial connection between the rear axle 1 and the transverse joint, or any part of it, and there could be attached to it any suitable extension or connections for carrying the springs, or any other fitments that may be desired.

Petrol, oil, and water pipes may be fitted with flexible connections if they are required to connect between the sub-frame and the main frame, and the nearer the center of mass of the engine and gearbox is placed to the transverse joint, the smaller is the amount of energy required to rock them to and fro, and smaller also is the relative movement of such parts.

The front springing and steering connections may be of any known type, and the rear springs may be so placed or fitted as to render them easily protectable by covers of metal, or any flexible material.

I claim:—

1. In a motorcycle, a main frame, a sub-frame fulcrumed on the main frame and supporting the rear wheel of the motorcycle, a vertical extension on the rear end of the sub-frame, a leaf spring pivoted to the main frame and having a sliding connection with the extension, a motor fixed to the sub-frame at its fulcrum point, and a driving connection between the rear wheel and the motor.

2. In a motor cycle, a main frame, a motor mounted on the main frame, a sub-frame carried by the rear axle and having a pivotal connection at its forward end with the main frame, said connection comprising lugs on the sub-frame, a bolt extending through said motor and said lugs, and a bushing surrounding the bolt.

GRANVILLE EASTWOOD BRADSHAW.

Copies of this patent may be obtained for five cents each, by addressing the "Commissioner of Patents, Washington, D. C."